US010428936B2

(12) United States Patent
Tsuchida et al.

(10) Patent No.: US 10,428,936 B2
(45) Date of Patent: Oct. 1, 2019

(54) HYDRAULIC CONTROL DEVICE FOR AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kenichi Tsuchida, Nishio (JP); Toshiaki Hayashi, Toyohashi (JP); Yuta Seriguchi, Anjo (JP); Masafumi Takasu, Anjo (JP); Yoichiro Kimura, Anjo (JP); Kenichi Ishii, Anjo (JP); Syuji Moriyama, Nagakute (JP); Yoshinobu Soga, Toyota (JP); Hiromitsu Nitani, Okazaki (JP); Takafumi Inagaki, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 15/743,880

(22) PCT Filed: Aug. 19, 2016

(86) PCT No.: PCT/JP2016/074230
§ 371 (c)(1),
(2) Date: Jan. 11, 2018

(87) PCT Pub. No.: WO2017/038503
PCT Pub. Date: Mar. 9, 2017

(65) Prior Publication Data
US 2018/0202541 A1    Jul. 19, 2018

(30) Foreign Application Priority Data
Sep. 4, 2015 (JP) ................................. 2015-174560

(51) Int. Cl.
*F16H 61/02* (2006.01)
*F16H 61/12* (2010.01)
(Continued)

(52) U.S. Cl.
CPC ..... *F16H 61/0206* (2013.01); *F16H 61/0267* (2013.01); *F16H 61/0403* (2013.01);
(Continued)

(58) Field of Classification Search
CPC ......................... F16H 61/0267; F16H 61/0206
See application file for complete search history.

(56) References Cited

U.S. PATENT DOCUMENTS 4,967,621 A * 11/1990 Soga ...................... B60W 30/18
477/45
5,853,343 A * 12/1998 Eggert .................. F16H 37/022
475/210
(Continued)

FOREIGN PATENT DOCUMENTS

| JP | 2012-207722 A | 10/2012 |
|---|---|---|
| JP | 2014-163500 A | 9/2014 |
| JP | 2016-14399 A | 1/2016 |
| WO | 2013/176208 A1 | 11/2013 |

OTHER PUBLICATIONS

Nov. 22, 2016 Search Report issued in International Patent Application No. PCT/JP2016/074230.

*Primary Examiner* — Derek D Knight
(74) *Attorney, Agent, or Firm* — Oliff PLC

(57) ABSTRACT

A hydraulic control device that includes a source pressure generating valve that generates a source pressure; a solenoid valve that can supply the engagement pressure based on the source pressure; and a supply pressure switching valve that can be switched between a first state where the supply pressure switching valve can supply the engagement pressure to the second engagement element and a second state
(Continued)

where the supply pressure switching valve can supply the source pressure to the second engagement element, the supply pressure switching valve being in the first state when the solenoid valve is operating normally, and being switched to the second state in case of abnormality in the solenoid valve.

8 Claims, 3 Drawing Sheets

(51) Int. Cl.
  *F16H 61/04* (2006.01)
  *F16H 61/14* (2006.01)
  *F16H 63/46* (2006.01)
(52) U.S. Cl.
  CPC ............. *F16H 61/12* (2013.01); *F16H 61/14* (2013.01); *F16H 63/46* (2013.01); *F16H 2061/1224* (2013.01); *F16H 2061/1264* (2013.01)

(56) References Cited

U.S. PATENT DOCUMENTS

| | | | |
|---|---|---|---|
| 8,784,251 B2 | 7/2014 | Ishikawa et al. | |
| 9,523,417 B2 * | 12/2016 | Nakagawa | F16H 37/022 |
| 9,890,853 B2 * | 2/2018 | Moriyama | F16H 61/12 |
| 2012/0011841 A1 * | 1/2012 | Ogata | F16H 61/0031 |
| | | | 60/459 |
| 2015/0087463 A1 | 3/2015 | Nakagawa et al. | |

* cited by examiner

FIG.2

| direction | mode | C1 | C2 | S1 | B1 |
|---|---|---|---|---|---|
| foward | stepped mode | ○ |  | ○ |  |
|  | stepless mode |  | ○ | (○) |  |
| reverse | stepped mode |  |  | ○ | ○ |

# HYDRAULIC CONTROL DEVICE FOR AUTOMATIC TRANSMISSION

BACKGROUND

The present disclosure relates to hydraulic control devices for automatic transmissions that are mounted on, e.g., vehicles and that include a plurality of engagement elements to be engaged and disengaged according to whether an oil pressure is supplied thereto or not.

For example, automatic transmissions using a belt-type stepless speed change mechanism that includes a pair of pulleys and a metal belt (or chain) wrapped around the pulleys and that steplessly performs shifting by changing the effective diameters of the pulleys are conventionally widely used as automatic transmissions that are preferably used for vehicles. Automatic transmissions using a toroidal-type stepless speed change mechanism, a cone ring-type stepless speed change mechanism, etc. instead of the belt-type stepless speed change mechanism are also known in the art.

Moreover, regarding these automatic transmissions, automatic transmissions have been developed which have two parallel power transmission paths, namely a first power transmission path coupling an input shaft and an output shaft via a forward-reverse switching device and a second power transmission path coupling the input shaft and the output shaft via a stepless speed change mechanism (see WO 2013/176208). In such an automatic transmission, the forward-reverse switching device has a first clutch that is engaged only when a vehicle moves forward and a brake that is engaged only when the vehicle moves backward, a synchromesh mechanism (hereinafter referred to as the synchro mechanism) is inserted in the first power transmission path, and a second clutch is inserted in the second power transmission path.

This automatic transmission therefore includes four engagement elements, namely the first and second clutches, the brake, and the synchro mechanism.

SUMMARY

However, a hydraulic control device that engages and disengages the four engagement elements is not disclosed in the automatic transmission of WO 2013/176208. In hydraulic control devices, a hydraulic circuit is usually formed in a valve body by a solenoid valve, a switch valve, etc. Such a hydraulic circuit can be applied to the automatic transmission of WO 2013/176208, but failures etc. of various valves have not been considered.

Accordingly, for example, in case of a failure in which the second clutch coupling the second power transmission path having the stepless speed change mechanism inserted therein is disengaged while the vehicle is moving by using the stepless speed change mechanism, the second clutch cannot be engaged, which creates a risk that the vehicle may not be able to move by using the stepless speed change mechanism.

An exemplary aspect of the present disclosure provides a hydraulic control device for an automatic transmission that can switch between a power transmission path having a gear train inserted therein and a power transmission path having a stepless speed change mechanism inserted therein, and that allows a vehicle to move by using the stepless speed change mechanism even if a failure occurs in a hydraulic circuit while the vehicle is moving at high speeds by using the stepless speed change mechanism.

A hydraulic control device for an automatic transmission according to the present disclosure is a hydraulic control device for an automatic transmission, the automatic transmission including an input shaft drivingly coupled to a driving source of a vehicle, a drive shaft drivingly coupled to a wheel, a stepless speed change mechanism that can continuously change a speed ratio, a first engagement element inserted in a first power transmission path coupling the input shaft and the drive shaft via a gear train, and a second engagement element inserted in a second power transmission path coupling the input shaft and the drive shaft via the stepless speed change mechanism, the automatic transmission being capable of switching between a first mode in which the first engagement element is engaged and the second engagement element is disengaged so that the input shaft and the drive shaft are connected by the first power transmission path to transmit rotation therethrough and a second mode in which the first engagement element is disengaged and the second engagement element is engaged so that the input shaft and the drive shaft are connected by the second power transmission path to transmit rotation therethrough, the hydraulic control device being capable of permitting and cutting off supply of an engagement pressure to the first engagement element and the second engagement element. The hydraulic control device includes: a source pressure generating valve that generates a source pressure; a solenoid valve that can supply the engagement pressure based on the source pressure; and a supply pressure switching valve that can be switched between a first state where the supply pressure switching valve can supply the engagement pressure to the second engagement element and a second state where the supply pressure switching valve can supply the source pressure to the second engagement element, the supply pressure switching valve being in the first state when the solenoid valve is operating normally, and being switched to the second state in case of abnormality in the solenoid valve.

According to the hydraulic control device for the automatic transmission, for example, if abnormality has occurred in the solenoid valve, the supply pressure switching valve is switched from the first state to the second state, so that the supply pressure switching valve can supply the source pressure to the second engagement element. Accordingly, even if abnormality has occurred in the solenoid valve, the source pressure is supplied to the second engagement element, whereby operation can be continued. That is, even if a failure occurs in a hydraulic circuit when the vehicle is moving at high speeds by using the stepless speed change mechanism, the vehicle can continue to move by using the stepless speed change mechanism without switching the power transmission path from the second power transmission path to the first power transmission path. Accordingly, in the hydraulic control device for the automatic transmission that can switch between the first power transmission path having the gear train inserted therein and the second power transmission path having the stepless speed change mechanism inserted therein, even if a failure occurs in the hydraulic circuit when the vehicle is moving at high speeds by using the stepless speed change mechanism, the vehicle can move by using the stepless speed change mechanism.

BRIEF DESCRIPTION OF THE DRAWINGS

FIG. 2 is an engagement table of the automatic transmission according to the embodiment.

DETAILED DESCRIPTION OF EMBODIMENTS

Figure 1:
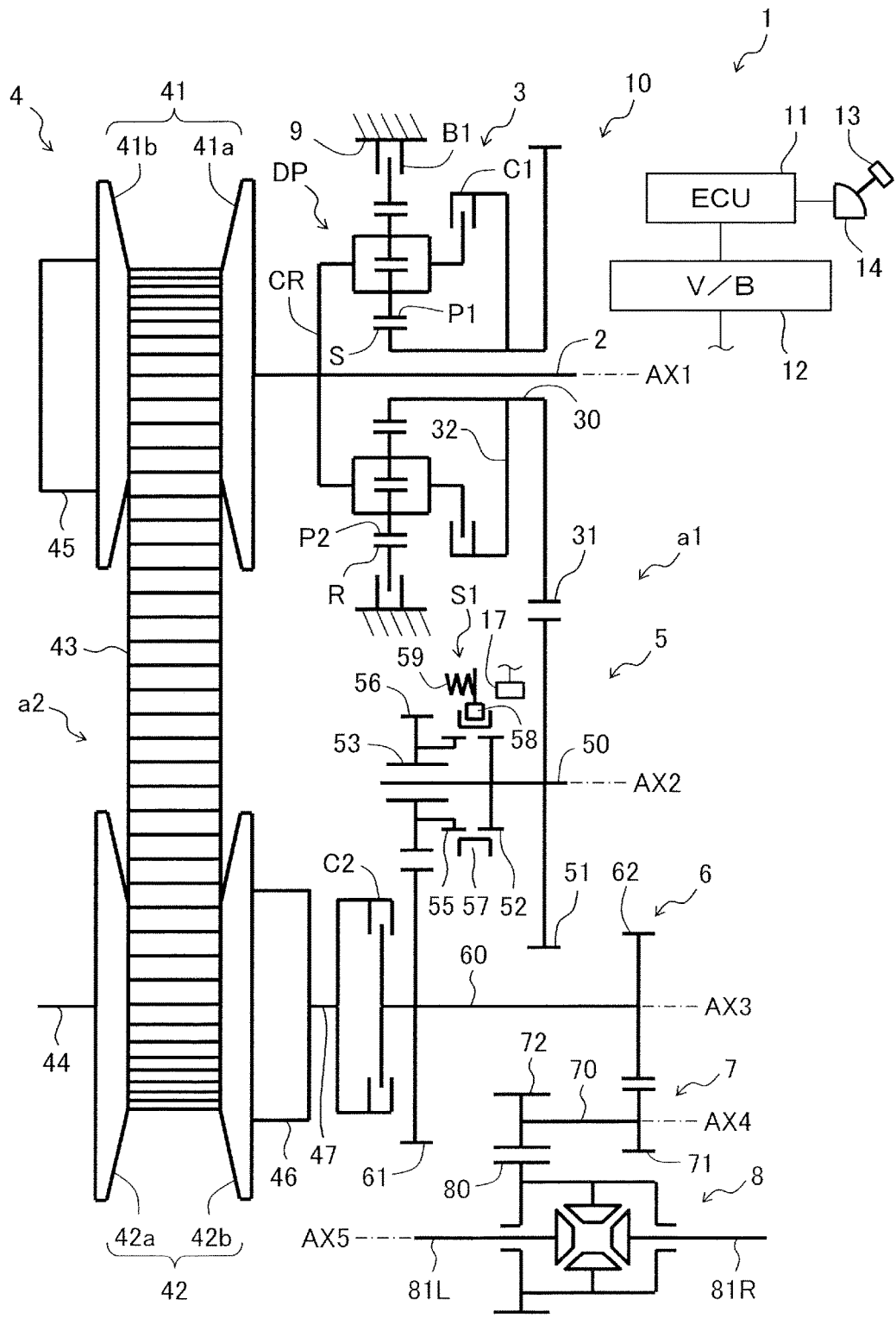
FIG. 1 is a skeleton diagram showing an automatic transmission according to an embodiment.

A hydraulic control device 12 for an automatic transmission 10 according to an embodiment will be described with reference to FIGS. 1 to 3. As used herein, the expression "drivingly coupled" refers to the state where rotary elements are coupled together so that they can transmit a driving force therebetween. The expression "drivingly coupled" is used as a concept including the state where the rotary elements are coupled so as to rotate together or the state where the rotary elements are coupled via a clutch etc. so that they can transmit a driving force therebetween via the clutch etc.

The general configuration of a vehicle 1 equipped with the automatic transmission 10 of the present embodiment will be described with reference to FIG. 1. The vehicle 1 includes the automatic transmission 10, a control device (ECU) 11, and the hydraulic control device 12.

The automatic transmission 10 includes a torque converter (see FIG. 3), a forward-reverse switching device 3 and a stepless speed change mechanism 4 which have an input shaft 2, a reduction gear mechanism (gear train) 5, an output gear portion 6 having a drive shaft 60, a countershaft portion 7, a differential unit 8, and a transmission case 9 accommodating these components. The automatic transmission 10 has a first power transmission path a1 that couples the input shaft 2 of the forward-reverse switching device 3 and the drive shaft 60 of the output gear portion 6 via the reduction gear mechanism 5, and a second power transmission path a2 that couples the input shaft 2 and the drive shaft 60 via the stepless speed change mechanism 4. The automatic transmission 10 has first to fifth axes A1 to A5 that are parallel to each other.

The first axis AX1 is coaxial with a crankshaft of an internal combustion engine (driving source), not shown. An input shaft of the automatic transmission 10 which is coupled to the crankshaft, the torque converter, the input shaft 2 of the forward-reverse switching device 3 and the stepless speed change mechanism 4, a planetary gear DP, a first clutch (first engagement element) C1, and a first brake (third engagement element) B1 of the forward-reverse switching device 3, and a primary pulley 41 of the stepless speed change mechanism 4 are disposed on the first axis AX1. That is, the input shaft 2 is drivingly coupled to the internal combustion engine of the vehicle 1.

The reduction gear mechanism 5 is disposed on the second axis AX2. A secondary pulley 42 of the stepless speed change mechanism 4, a second clutch (second engagement element) C2, and the output gear portion 6 are disposed on the third axis AX3. The countershaft portion 7 is disposed on the fourth axis AX4. The differential unit 8 and left and right drive shafts 81L, 81R are disposed on the fifth axis AX5.

The input shaft of the automatic transmission 10 which is coupled to the crankshaft is coupled to the input shaft 2 of the forward-reverse switching device 3 and the stepless speed change mechanism 4 via the torque converter 15. The torque converter 15 has a lockup clutch 16 and has a lockup-on port 15a through which an oil pressure for engaging the lockup clutch 16 is supplied and a lockup-off port 15b through which an oil pressure for disengaging the lockup clutch 16 is supplied (see FIG. 3).

The forward-reverse switching device 3 includes the planetary gear DP, the first brake B1, and the first clutch C1, and switches the rotational direction according to the direction in which the vehicle 1 moves and transmits rotation in the resultant rotational direction. The input shaft 2 extends through the inner peripheral part of the planetary gear DP and is connected to the primary pulley 41 of the stepless speed change mechanism 4, and is also connected to a carrier CR of the planetary gear DP. The planetary gear DP is what is called a double-pinion planetary gear having a sun gear S, a ring gear R, and the carrier CR rotatably supporting a pinion P1 meshing with the sun gear S and a pinion P2 meshing with the ring gear R. Rotation of the ring gear R relative to the transmission case 9 can be stopped by the first brake B1. The sun gear S is directly coupled to a hollow shaft 30, the carrier CR is connected to the hollow shaft 30 through the first clutch C1, and the hollow shaft 30 is coupled to a forward-reverse rotation output gear 31. The hollow shaft 30 is also connected to a clutch drum 32 of the first clutch C1, and the forward-reverse rotation output gear 31, the hollow shaft 30, and the clutch drum 32 together form a rotary member. That is, the forward-reverse switching device 3 has the first clutch C1 and the first brake B1 and can switch between a forward mode in which the first clutch C1 is engaged and the first brake B1 is disengaged to move the vehicle 1 forward and a reverse mode in which the first clutch C1 is disengaged and the first brake B1 is engaged to move the vehicle 1 backward.

When the first clutch C1 is engaged, the first clutch C1 forms a path through which rotation in such a direction that the vehicle 1 moves forward is transmitted. When the first brake B1 is engaged, the first brake B1 forms a path through which rotation in such a direction that the vehicle 1 moves backward is transmitted. The forward-reverse rotation output gear 31 meshes with an input gear 51 of the reduction gear mechanism 5. That is, the first clutch C1 is inserted in the first power transmission path a1.

The reduction gear mechanism 5 includes a first rotary shaft 50 disposed on the second axis AX2, the input gear 51 mounted on the first rotary shaft 50, and a synchro mechanism (synchromesh mechanism) S1 mounted on the first rotary shaft 50 and inserted in the first power transmission path a1, and a second rotary shaft 53 as a hollow shaft and an output gear 56 which can rotate relative to the first rotary shaft 50. The input gear 51 is fixedly coupled to one side of the first rotary shaft 50. The second rotary shaft 53 is supported on the outer periphery of the other side of the first rotary shaft 50 via, e.g., a needle bearing (not shown) so that the second rotary shaft 53 can rotate relative to the first rotary shaft 50. That is, the second rotary shaft 53 and the first rotary shaft 50 are disposed as a double shaft with the first rotary shaft 50 overlapping the second rotary shaft 53 in the axial direction. The output gear 56 is fixedly coupled to the second rotary shaft 53. The output gear 56 meshes with an input gear 61 of the output gear portion 6.

The synchro mechanism S1 includes a drive gear 52, a driven gear 55, a synchronizer, not shown, a sleeve 57, a shift fork 58, a biasing spring (biasing portion) 59, and a synchronization detection portion 17, and can engage and disengage the first rotary shaft 50 with and from the second rotary shaft 53.

The drive gear 52 has a smaller diameter than the input gear 51 and is fixedly coupled to the one side of the first rotary shaft 50. The driven gear 55 has the same diameter as the drive gear 52 and has a smaller diameter than the output gear 56, and is fixedly coupled to the second rotary shaft 53. The synchronizer is disposed on the drive gear 52 side of the driven gear 55.

The sleeve 57 has gear teeth formed on its inner peripheral surface and is disposed on the outer peripheries of the drive gear 52 and the driven gear 55 so that the sleeve 57 can move in the axial direction. The sleeve 57 is driven to move in the axial direction by the shift fork 58 that is driven by a hydraulic servo 93 described later (see FIG. 3). The sleeve 57 is thus driven to slide between the position where the sleeve 57 meshes only with the drive gear 52 and the position where the sleeve 57 meshes both the drive gear 52 and the driven gear 55. The drive gear 52 and the driven gear 55 can thus be switched between a disengaged state (decoupled state) and an engaged state (drivingly coupled state).

The biasing spring 59 applies a biasing force to the shift fork 58 in such a direction that the drive gear 52 and the driven gear 55 are switched to the disengaged state. Accordingly, when an engagement pressure PSLG or a modulator pressure $P_{LPM2}$ is supplied to the hydraulic servo 93, the hydraulic servo 93 moves the shift fork 58 against the biasing force of the biasing spring 59 so as to switch the drive gear 52 and the driven gear 55 to the engaged state. When the hydraulic servo 93 is drained, the biasing spring 59 moves the shift fork 58 so as to switch the drive gear 52 and the driven gear 55 to the disengaged state. That is, when the engagement pressure PSLG or the modulator pressure $P_{LPM2}$ is supplied, the synchro mechanism S1 is kept in the engaged state (activated state). When the engagement pressure PSLG or the modulator pressure $P_{LPM2}$ is not supplied, the biasing spring 59 switches the synchro mechanism S1 to the disengaged state.

The stepless speed change mechanism 4 can continuously change the speed ratio. In the present embodiment, a belt-type stepless automatic speed change mechanism is used as the stepless speed change mechanism 4. However, the present disclosure is not limited to this. For example, a toroidal-type stepless speed change mechanism, a cone ring-type stepless speed change mechanism, etc. may be used as the stepless speed change mechanism 4. The stepless speed change mechanism 4 includes the primary pulley 41 connected to the input shaft 2, the secondary pulley 42, and an endless belt 43 wrapped around the primary pulley 41 and the secondary pulley 42. The primary pulley 41 has conical wall surfaces facing each other and has a fixed sheave 41a fixed so as not to be movable relative to the input shaft 2 in the axial direction and a movable sheave 41b supported so as to be movable relative to the input shaft 2 in the axial direction. The belt 43 is held in a groove formed by the fixed sheave 41a and the movable sheave 41b and having a V-shaped section.

Similarly, the secondary pulley 42 has conical wall surfaces facing each other and has a fixed sheave 42a fixed so as not to be movable relative to a central shaft 44 in the axial direction and a movable sheave 42b supported so as to be movable relative to the central shaft 44 in the axial direction. The belt 43 is held in a groove formed by the fixed sheave 42a and the movable sheave 42b and having a V-shaped section. The fixed sheave 41a of the primary pulley 41 and the fixed sheave 42a of the secondary pulley 42 are located on the opposite sides of the belt 43 in the axial direction.

A hydraulic servo 45 is placed on the back side of the movable sheave 41b of the primary pulley 41, and a hydraulic servo 46 is placed on the back side of the movable sheave 42b of the secondary pulley 42. A primary pressure is supplied as a hydraulic oil pressure from a primary pressure control valve, not shown, of the hydraulic control device 12 to the hydraulic servo 45, and a secondary pressure is supplied as a hydraulic oil pressure from a secondary pressure control valve, not shown, of the hydraulic control device 12 to the hydraulic servo 46. As these hydraulic oil pressures are supplied to the hydraulic servos 45, 46, the hydraulic servos 45, 46 generate a belt clamping force corresponding to load torque and also generate a clamping force that changes or fixes the speed ratio.

An output shaft 47 of the movable sheave 42b of the secondary pulley 42 is connected to the drive shaft 60 of the output gear portion 6 via the second clutch C2. That is, the second clutch C2 is inserted in the second power transmission path a2. The output gear portion 6 has the drive shaft 60, the input gear 61 fixedly coupled to one end of the drive shaft 60, and a counter gear 62 fixedly coupled to the other end of the drive shaft 60. The counter gear 62 meshes with a drive gear 71 of the countershaft portion 7.

The countershaft portion 7 has a countershaft 70, the drive gear 71 fixedly coupled to the countershaft 70, and a driven gear 72 fixedly coupled to the countershaft 70. The driven gear 72 meshes with a differential ring gear 80 of the differential unit 8.

The differential unit 8 transmits rotation of the differential ring gear 80 to the left and right drive shafts 81L, 81R while absorbing differential rotation therebetween. The left and right drive shafts 81L, 81R are coupled to left and right wheels, not shown. Since the differential ring gear 80 meshes with the driven gear 72 and the drive gear 71 meshes with the counter gear 62, the drive shaft 60 of the output gear portion 6, the countershaft 70 of the countershaft portion 7, and the differential unit 8 are drivingly coupled to the wheels via the left and right drive shafts 81L, 81R and therefore always move with the wheels.

The ECU 11 includes, e.g., a CPU, a ROM that stores processing programs, a RAM that temporarily stores data, input and output ports, and a communication port, and outputs various signals such as control signals for the hydraulic control device 12 from the output port. The vehicle 1 is provided with a shift lever 13 that allows a driver to select a driving range, and a shift position detection portion 14 that detects the shift position of the shift lever 13.

The automatic transmission 10 configured as described above can switch among a forward stepped mode (first mode), a forward stepless mode (second mode), and a reverse stepped mode as the first clutch C1, the second clutch C2, the synchro mechanism S1, and the first brake B1, which are shown in the skeleton diagram of FIG. 1, are engaged and disengaged in combinations shown in the engagement table of FIG. 2. In the forward stepped mode, the first clutch C1 is engaged and the second clutch C2 is disengaged, so that the input shaft 2 and the drive shaft 60 are connected by the first power transmission path a1 to transmit rotation therethrough. In the forward stepless mode, the first clutch C1 is disengaged and the second clutch C2 is engaged, so that the input shaft 2 and the drive shaft 60 are connected by the second power transmission path a2 to transmit rotation therethrough. In the present embodiment, the stepped mode, namely the first mode, means a first forward speed or a first reverse speed at which rotation of a driving force is transmitted through the first power transmission path a1. However, the present disclosure is not limited to this, and the stepped mode may be multi-speed shifting. In the present embodiment, the stepless mode, namely the second mode, means forward stepless shifting in which rotation of a driving force is transmitted through the second power transmission path a2.

The hydraulic control device 12 for the automatic transmission 10 according to the present embodiment will be described below. In the present embodiment, each valve actually has a single spool. In order to explain the position to which the spool is switched or controlled, the "right-half position" refers to the spool position shown in the right half of the valve in FIG. 3, and the "left-half position" refers to the spool position shown in the left half of the valve in FIG. 3.

The hydraulic control device 12 regulates an oil pressure generated by an oil pump, not shown, to a line pressure PL and a secondary pressure Psec by a primary regulator valve and a secondary regulator valve based on a throttle opening.

Figure 3:
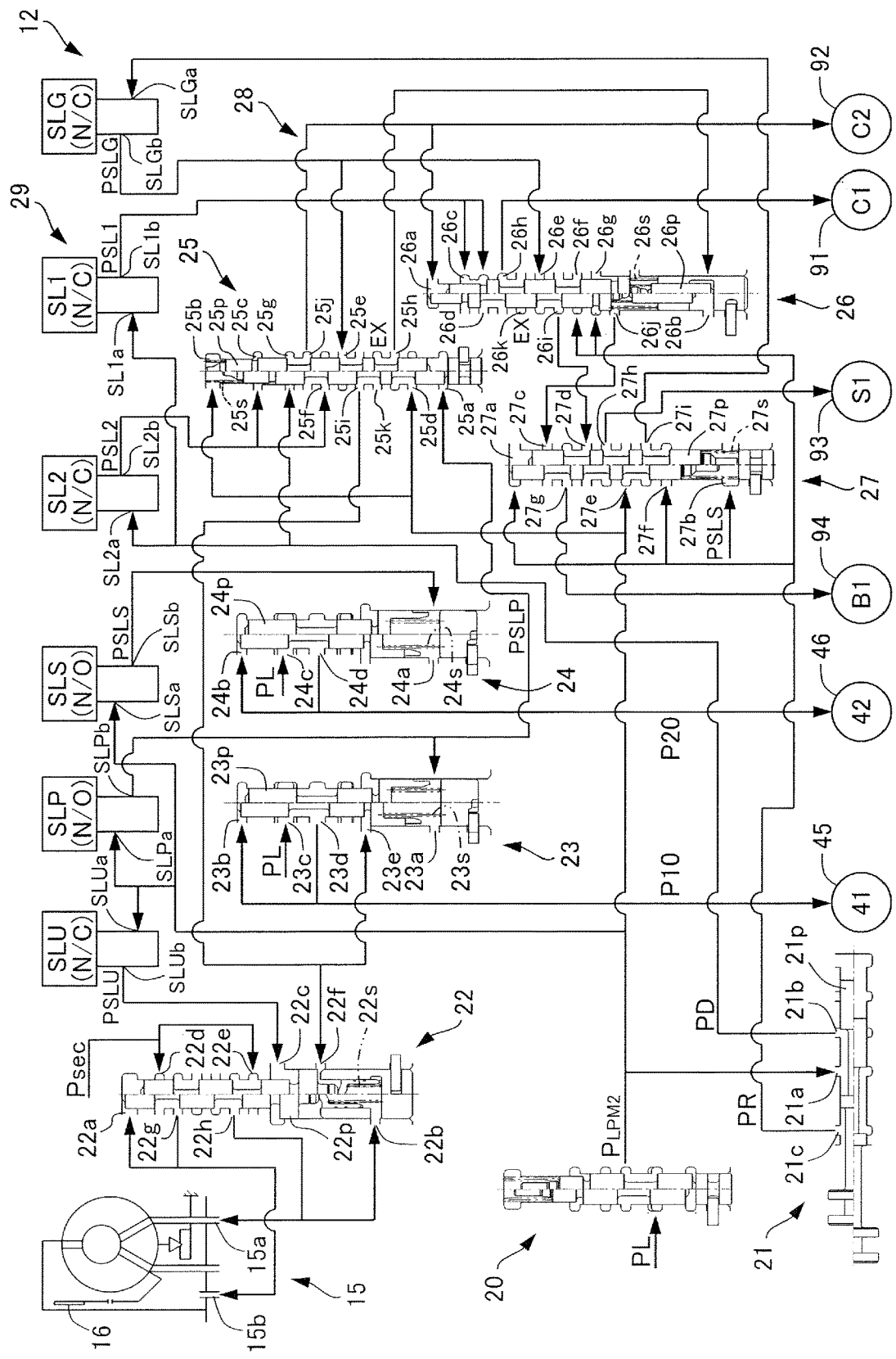
FIG. 3 is a schematic view of a hydraulic control device according to the embodiment.

As shown in FIG. 3, the hydraulic control device 12 has a line pressure modulator valve (source pressure generating portion/valve) 20, a manual valve (range pressure output mechanism) 21, a linear solenoid valve SLU, and a lockup differential pressure control valve 22. The hydraulic control device 12 further has a primary linear solenoid valve (primary control pressure solenoid valve) SLP, a primary pressure control valve 23, a secondary linear solenoid valve SLS, and a secondary pressure control valve 24. The hydraulic control device 12 further has a linear solenoid valve (first solenoid valve) SL1, a linear solenoid valve (second solenoid valve) SL2, a linear solenoid valve (third solenoid valve) SLG, a sequence valve (second switch valve) 25, a clutch apply control valve (first switch valve) 26, and an S1B1 apply control valve (third switch valve) 27.

The linear solenoid valves SLU, SL1, SL2, SLG are of what is called a normally closed (N/C) type that cuts off communication between an input port and an output port when no current is applied (hereinafter also referred to as "off") and that allows the input port to communicate with the output port when a current is applied (hereinafter also referred to as "on"). The linear solenoid valves SLP, SLS are be of a normally open (N/O) type that cuts off communication between an input port and an output port when a current is applied and that allows the input port to communicate with the output port when no current is applied.

The hydraulic control device 12 is connected to a hydraulic servo 91 that is hydraulically operated and can engage and disengage the first clutch C1, a hydraulic servo 92 that is hydraulically operated and can engage and disengage the second clutch C2, the hydraulic servo 93 that is hydraulically operated and can engage and disengage the synchro mechanism S1, and a hydraulic servo 94 that is hydraulically operated and can engage and disengage the first brake B1.

The line pressure modulator valve 20 regulates the line pressure PL to generate the modulator pressure (source pressure) $P_{LPM2}$ that is a fixed pressure lower than the line pressure PL.

The manual valve 21 includes a spool 21$p$ that is moved mechanically or electrically according to operation of the shift lever 13 (see FIG. 1), an input port 21$a$ that receives the modulator pressure $P_{LPM2}$, an output port 21$b$ that outputs the modulator pressure $P_{LPM2}$ as a forward range pressure PD when the spool 21$p$ is located at a drive (D) range position, and an output port 21$c$ that outputs the modulator pressure $P_{LPM2}$ as a reverse range pressure PR when the spool 21$p$ is located at a reverse (R) range position. That is, the manual valve 21 outputs the forward range pressure PD when the driving range is a forward range, and outputs the reverse range pressure PR when the driving range is a reverse range.

The linear solenoid valve SLU has an input port SLUa that receives the modulator pressure $P_{LPM2}$ and an output port SLUb that communicates with a third hydraulic oil chamber 22$c$ of the lockup differential pressure control valve 22. The linear solenoid valve SLU regulates and controls as desired the modulator pressure $P_{LPM2}$ received through the input port SLUa to generate a lockup control pressure PSLU to be supplied to the lockup differential pressure control valve 22, and supplies the lockup control pressure PSLU through the output port SLUb.

The lockup differential pressure control valve 22 includes a spool 22$p$ that can be switched between the left-half position (lockup-off state) and the right-half position (lockup-on state), and a spring 22$s$ that is a compression coil spring that biases the spool 22$p$ to the left-half position. The lockup differential pressure control valve 22 includes a first hydraulic oil chamber 22$a$ that can receive a lockup-off pressure in such a direction that the spool 22$p$ is pressed to the right-half position, a second hydraulic oil chamber 22$b$ that can receive a lockup-on pressure in such a direction that the spool 22$p$ is pressed to the left-half position, and the third hydraulic oil chamber 22$c$ to which the lockup control pressure PSLU is supplied in such a direction that the spool 22$p$ is pressed to the right-half position. The lockup differential pressure control valve 22 includes a first input port 22$d$ and a second input port 22$e$ which receive the secondary pressure Psec, a third input port 22$f$ that communicates with a second output port 25$i$ of the sequence valve 25, a first output port 22$g$ that communicates with the lockup-off port 15$b$ and the first hydraulic oil chamber 22$a$ and outputs the lockup-off pressure, and a second output port 22$h$ that communicates with the lockup-on port 15$a$ and the second hydraulic oil chamber 22$b$ and outputs the lockup-on pressure. The lockup differential pressure control valve 22 controls the engagement state of the lockup clutch 16 by regulating the lockup control pressure PSLU.

The primary linear solenoid valve SLP has an input port SLPa that receives the modulator pressure $P_{LPM2}$ and an output port SLPb that communicates with a first hydraulic oil chamber 23$a$ of the primary pressure control valve 23 and communicates with a first hydraulic oil chamber 25$a$ of the sequence valve 25. The primary linear solenoid valve SLP supplies a primary control pressure PSLP to the primary pressure control valve 23 to regulate a primary pulley pressure P10 to be supplied from the primary pressure control valve 23 to the hydraulic servo 45 of the stepless speed change mechanism 4.

The primary pressure control valve 23 includes a spool 23$p$ that can be switched between the left-half position (fully open state) and the right-half position (fully closed state), and a spring 23$s$ that is a compression coil spring that biases the spool 23$p$ to the left-half position. The primary pressure control valve 23 includes the first hydraulic oil chamber 23$a$ that receives the primary control pressure PSLP in such a direction that the spool 23$p$ is pressed to the left-half position, a second hydraulic oil chamber 23$b$ that receives the primary pulley pressure P10 in such a direction that the spool 23$p$ is pressed to the right-half position, and a third hydraulic oil chamber 23$e$ that communicates with the second output port 25$i$ of the sequence valve 25 and can receive the engagement pressure PSLG in such a direction that the spool 23$p$ is pressed toward the right-half position. The primary pressure control valve 23 includes an input port 23$c$ that receives the line pressure PL and an output port 23$d$ that supplies the regulated primary pulley pressure P10 to the hydraulic servo 45 of the primary pulley 41 and the second hydraulic oil chamber 23$b$. The primary pressure control valve 23 adjusts the magnitude of the primary pulley pressure P10 regulated based on the line pressure PL, according to the magnitude of the primary control pressure PSLP.

The secondary linear solenoid valve SLS has an input port SLSa that receives the modulator pressure $P_{LPM2}$ and an output port SLSb that communicates with a first hydraulic oil chamber 24$a$ of the secondary pressure control valve 24.

The secondary linear solenoid valve SLS supplies a secondary control pressure PSLS to the secondary pressure control valve 24 to regulate a secondary pulley pressure P20 to be supplied from the secondary pressure control valve 24 to the hydraulic servo 46 of the stepless speed change mechanism 4.

The secondary pressure control valve 24 includes a spool 24p that can be switched between the left-half position (fully open state) and the right-half position (fully closed state), and a spring 24s that is a compression coil spring that biases the spool 24p to the left-half position. The secondary pressure control valve 24 includes the first hydraulic oil chamber 24a that receives the secondary control pressure PSLS in such a direction that the spool 24p is pressed to the left-half position, and a second hydraulic oil chamber 24b that receives the secondary pulley pressure P20 in such a direction that the spool 24p is pressed to the right-half position. The secondary pressure control valve 24 includes an input port 24c that receives the line pressure PL and an output port 24d that supplies the regulated secondary pulley pressure P20 to the hydraulic servo 46 of the secondary pulley 42 and the third hydraulic oil chamber 24b. The secondary pressure control valve 24 adjusts the magnitude of the secondary pulley pressure P20 regulated based on the line pressure PL, according to the magnitude of the secondary control pressure PSLS.

The linear solenoid valve SL1 has an input port SL1a that receives the forward range pressure PD and an output port SL1b that communicates with a first input port 26c and a second input port 26d of the clutch apply control valve 26. The linear solenoid valve SL1 regulates and controls as desired the forward range pressure PD received through the input port SL1a to generate an engagement pressure (first engagement pressure) PSL1 to be supplied to the hydraulic servo 91, and supplies the engagement pressure PSL1 through the output port SL1b.

The linear solenoid valve SL2 has an input port SL2a that receives the forward range pressure PD and an output port SL2b that communicates with a third hydraulic oil chamber 25c and a third input port 25f of the sequence valve 25. The linear solenoid valve SL2 regulates and controls as desired the forward range pressure PD received through the input port SL2a to generate an engagement pressure (second engagement pressure) PSL2 to be supplied to the hydraulic servo 92, and supplies the engagement pressure PSL2 through the output port SL2b.

The linear solenoid valve SLG has an input port SLGa that receives the modulator pressure $P_{LPM2}$ or the reverse range pressure PR, and an output port SLGb that communicates with a second input port 25e of the sequence valve 25 and a third input port 26e of the clutch apply control valve 26. The linear solenoid valve SLG regulates and controls as desired the modulator pressure $P_{LPM2}$ or the reverse range pressure PR received through the input port SLGa to generate the engagement pressure PSLG to be supplied to the hydraulic servo 93 or the hydraulic servo 94, and supplies the engagement pressure PSLG through the output port SLGb.

The sequence valve 25 includes a spool 25p that can be switched between the left-half position (third position, first state, normal state) and the right-half position (fourth position, second state, failure state), and a spring 25s that is a compression coil spring that biases the spool 25p to the left-half position. The sequence valve 25 includes the first hydraulic oil chamber 25a that receives the primary control pressure PSLP in such a direction that the spool 25p is pressed to the right-half position, a second hydraulic oil chamber 25b that receives the modulator pressure $P_{LPM2}$ in such a direction that the spool 25p is pressed to the left-half position, and the third hydraulic oil chamber 25c that receives the engagement pressure PSL2 in such a direction that the spool 25p is pressed to the left-half position. The sequence valve 25 includes a first input port 25d that receives the modulator pressure $P_{LPM2}$, the second input port 25e that receives the engagement pressure PSLG, the third input port 25f that receives the engagement pressure PSL2, and a fourth input port 25g that receives the forward range pressure PD. The sequence valve 25 further includes a first output port 25h that communicates with a second hydraulic oil chamber 26b of the clutch apply control valve 26, the second output port 25i that communicates with the third hydraulic oil chamber 23e of the primary pressure control valve 23 and the third input port 22f of the lockup differential pressure control valve 22, a third output port 25j that communicates with the hydraulic servo 92, and a drain port 25k.

When the spool 25p of the sequence valve 25 is located at the left-half position, namely in the normal state, the first input port 25d communicates with the first output port 25h, communication between the second input port 25e and the fourth input port 25g is cut off, the third input port 25f communicates with the third output port 25j, and the second output port 25i communicates with the drain port 25k. When the spool 25p of the sequence valve 25 is located at the right-half position, namely in the failure state, communication between the first input port 25d and the third input port 25f is cut off, the second input port 25e communicates with the second output port 25i, the fourth input port 25g communicates with the third output port 25j, and the first output port 25h communicates with the drain port 25k.

The clutch apply control valve 26 includes a spool 26p that can be switched between the left-half position (first position, first state, normal state) and the right-half position (second position, second state, tie-up preventing state), and a spring 26s that is a compression coil spring that biases the spool 26p to the left-half position. The clutch apply control valve 26 includes a first hydraulic oil chamber 26a that receives the engagement pressure PSL2 or the forward range pressure PD in such a direction that the spool 26p is pressed to the right-half position, and the second hydraulic oil chamber 26b that receives the modulator pressure $P_{LPM2}$ in such a direction that the spool 26p is pressed to the left-half position. The clutch apply control valve 26 further includes the first input port 26c and the second input port 26d which receive the engagement pressure PSL1, the third input port 26e that receives the engagement pressure PSLG and a fourth input port 26f and a fifth input port 26g which receive the reverse range pressure PR. The clutch apply control valve 26 further includes a first output port 26h that communicates with the hydraulic servo 91, a second output port 26i that communicates with a second input port 27d of the S1B1 apply control valve 27, a third output port 26j that communicates with a first input port 27c of the S1B1 apply control valve 27, and a drain port 26k.

The pressure receiving area of the spool 26p is the same in both the first hydraulic oil chamber 26a and the second hydraulic oil chamber 26b. In the first input port 26c, the pressure receiving area of the spool 26p is made different on both sides in the axial direction of the spool 26p. Namely, in the first input port 26c, the pressure receiving area of the spool 26p is made larger on the side where the spool 26p is pressed to the right-half position. The biasing force of the spring 26s is made smaller than a pressing force that presses the spool 26p to the right-half position due to the difference in pressure receiving area of the spool 26p when the engagement pressure PSL1 is supplied to the first input port 26c. Accordingly, when the linear solenoid valves SL1, SL2 are operated simultaneously and the engagement pressures PSL1, PSL2 are output at the same time, the engagement pressure PSL2 and the modulator pressure $P_{LPM2}$ cancel each other at both end faces of the spool 26p, and the pressing force of the engagement pressure PSL1 supplied to the first input port 26c, namely the pressing force that presses the spool 26p to the right-half position due to the difference in pressure receiving area of the spool 26p, overcomes the spring 26s. The spool 26p is thus switched to the right-half position.

Similarly, in the fifth input port 26g, the pressure receiving area of the spool 26p is made different on both sides in the axial direction of the spool 26p. Namely, in the fifth input port 26g, the pressure receiving area of the spool 26p is made larger on the side where the spool 26p is pressed to the right-half position. The biasing force of the spring 26s is made smaller than a pressing force that presses the spool 26p to the right-half position due to the difference in pressure receiving area of the spool 26p when the reverse range pressure PR is supplied to the fifth input port 26g. Accordingly, when the linear solenoid valve SL2 is operated in the reverse range and the reverse range pressure PR and the engagement pressure PSL2 are output at the same time, the engagement pressure PSL2 and the modulator pressure $P_{LPM2}$ cancel each other at both end faces of the spool 26p, and the pressing force of the reverse range pressure PR supplied to the fifth input port 26g, namely the pressing force that presses the spool 26p to the right-half position due to the difference in pressure receiving area of the spool 26p, overcomes the spring 26s. The spool 26p is thus switched to the right-half position.

When the spool 26p of the clutch apply control valve 26 is located at the left-half position, namely in the normal state, the second input port 26d communicates with the first output port 26h, and the third input port 26e communicates with the second output port 26i. When the spool 26p of the clutch apply control valve 26 is located at the right-half position, namely in the tie-up preventing state, the first output port 26h communicates with the drain port 26k, the third input port 26e is blocked, and the fifth input port 26g communicates with the third output port 26j.

Accordingly, when the linear solenoid valve SL1 is operated and the linear solenoid valve SL2 is not operated, the clutch apply control valve 26 remains in the normal state, and the engagement pressure PSL1 is supplied to the hydraulic servo 91. When the linear solenoid valve SL2 is operated and the engagement pressure PSL2 is output from the third output port 25j of the sequence valve 25, and the linear solenoid valve SL1 is not operated, the clutch apply control valve 26 remains in the normal state and the engagement pressure PSL2 is supplied to the hydraulic servo 92. Moreover, when the linear solenoid valve SL2 is operated and the engagement pressure PSL2 is output from the third output port 25j of the sequence valve 25, and the linear solenoid valve SL1 is also operated, the clutch apply control valve 26 is switched to the tie-up preventing state, so that the hydraulic servo 91 is drained and the engagement pressure PSL2 is supplied to the hydraulic servo 92. This prevents the engagement pressure from being simultaneously supplied to the hydraulic servo 91 and the hydraulic servo 92 and thus prevents a tie-up due to simultaneous engagement of the first clutch C1 and the second clutch C2.

The S1B1 apply control valve 27 includes a spool 27p that can be switched between the left-half position (fifth position, non-reverse state) and the right-half position (sixth position, reverse state), and a spring 27s that is a compression coil spring that biases the spool 27p to the left-half position. The S1B1 apply control valve 27 includes a first hydraulic oil chamber 27a that receives the reverse range pressure PR in such a direction that the spool 27p is pressed to the right-half position, and a second hydraulic oil chamber 27b that receives the secondary control pressure PSLS in such a direction that the spool 27p is pressed to the left-half position. The S1B1 apply control valve 27 further includes the first input port 27c that receives the reverse range pressure PR, the second input port 27d that receives the engagement pressure PSLG, a third input port 27e that receives the modulator pressure $P_{LPM2}$, and a fourth input port 27f that receives the reverse range pressure PR. The S1B1 apply control valve 27 further includes a first output port 27g that communicates with the hydraulic servo 94, a second output port 27h that communicates with the hydraulic servo 93, and a third output port 27i that communicates with the input port SLGa of the linear solenoid valve SLG The pressure receiving area of the spool 27p is the same in both the first hydraulic oil chamber 27a and the second hydraulic oil chamber 27b. The biasing force of the spring 27s is made smaller than a pressing force that presses the spool 27p to the right-half position when the reverse range pressure PR is supplied to the first hydraulic oil chamber 27a. Accordingly, in the case where the reverse range pressure PR is supplied but the secondary control pressure PSLS is not supplied, the spool 27p is switched to the right-half position. In the case where the reverse range pressure PR is supplied and the secondary control pressure PSLS is also supplied, the reverse range pressure PR and the secondary control pressure PSLS cancel each other at both end faces of the spool 27p, and the spool 27p is located at the left-half position due to the biasing force of the spring 27s.

When the spool 27p of the S1B1 apply control valve 27 is located at the left-half position, namely in the non-reverse state, the first input port 27c communicates with the first output port 27g, and the second input port 27d communicates with the second output port 27h, the third input port 27e communicates with the third output port 27i, and the fourth input port 27f is blocked. When the spool 27p of the S1B1 apply control valve 27 is located at the right-half position, namely in the reverse state, the first input port 27c is blocked, the second input port 27d communicates with the first output port 27g, the third input port 27e communicates with the second output port 27h, and the fourth input port 27f communicates with the third output port 27i.

Accordingly, when the shift position of the manual valve 21 is other than the reverse range and the reverse range pressure PR is not generated, or when the shift position is the reverse range and the reverse range pressure PR is generated but the secondary control pressure PSLS is supplied, the S1B1 apply control valve 27 remains in the non-reverse state, and the modulator pressure $P_{LPM2}$ is supplied through the S1B1 apply control valve 27 to the linear solenoid valve SLG the engagement pressure PSLG is supplied through the S1B1 apply control valve 27 to the hydraulic servo 93, and the hydraulic servo 94 is drained from the clutch apply control valve 26 through the S1B1 apply control valve 27. When the shift position is the reverse range and the reverse range pressure PR is generated, and the secondary control pressure PSLS is equal to or lower than a set pressure, the S1B1 apply control valve 27 is switched to the reverse state, the modulator pressure $P_{LPM2}$ is supplied through the S1B1 apply control valve 27 to the hydraulic servo 93, the reverse range pressure PR is supplied through the S1B1 apply control valve 27 to the linear solenoid valve SLG, and the engagement pressure PSLG is supplied through the S1B1 apply control valve 27 to the hydraulic servo 94.

As described above, the hydraulic control device 12 controls engagement and disengagement of each engagement element, shifting of the stepless speed change mechanism 4, etc. by permitting and cutting off supply of an engagement pressure to the first clutch C1, the second clutch C2, the first brake B1, the synchro mechanism S1, and the hydraulic servos 45, 46 according to a command from the ECU 11. In the present embodiment, a solenoid valve portion 29 (solenoid valve) is formed by the linear solenoid valve SL1 and the linear solenoid valve SL2. That is, the solenoid valve portion 29 can supply the engagement pressures PSL1, PSL2 based on the forward range pressure PD.

In the present embodiment, a supply pressure switching portion 28 (supply pressure switching valve) is formed by the sequence valve 25, the clutch apply control valve 26, and the S1B1 apply control valve 27. That is, in the present embodiment, the supply pressure switching portion 28 can be switched between a first state where the supply pressure switching portion 28 can supply the engagement pressure PSL2 to the hydraulic servo 92 for the second clutch C2 and a second state where the supply pressure switching portion 28 can supply the forward range pressure PD to the hydraulic servo 92 for the second clutch C2. The supply pressure switching portion 28 is in the first state when in the normal state (when operating normally) and is switched from the first state to the second state when in the failure state (in case of abnormality). Moreover, the supply pressure switching portion 28 cuts off supply of the engagement pressure PSL1 to the hydraulic servo 91 for the first clutch C1 in the case where the engagement pressure PSL2 is supplied to the hydraulic servo 92 for the second clutch C2 when the supply pressure switching portion 28 is in the first state, and in the case where the forward range pressure PD is supplied to the hydraulic servo 92 for the second clutch C2 when the supply pressure switching portion 28 is in the second state.

In the present embodiment, when in the first state, the clutch apply control valve 26 is located at the first position where the clutch apply control valve 26 can supply the engagement pressure PSL1 to the hydraulic servo 91 for the first clutch C1, and when in the second state, the clutch apply control valve 26 is located at the second position where the clutch apply control valve 26 cuts off supply of the engagement pressure PSL1 to the hydraulic servo 91 for the first clutch C1. In the present embodiment, when in the first state, the sequence valve 25 is located at the third position where the sequence valve 25 can supply the engagement pressure PSL2 to the hydraulic servo 92 for the second clutch C2, and the sequence valve 25 also supplies the engagement pressure (signal pressure) PSL2 for switching the clutch apply control valve 26 to the second position when supplying the engagement pressure PSL2 to the hydraulic servo 92 for the second clutch C2. When in the second state, the sequence valve 25 is located at the fourth position where the sequence valve 25 can supply the forward range pressure PD to the hydraulic servo 92 for the second clutch C2, and the sequence valve 25 also supplies the forward range pressure (signal pressure) PD for switching the clutch apply control valve 26 to the second position when supplying the forward range pressure PD to the hydraulic servo 92 for the second clutch C2.

Moreover, in the present embodiment, when the vehicle is moving backward normally, the clutch apply control valve 26 is located at the first position and the engagement pressure PSLG can be supplied to the hydraulic servo 94 for the first brake B1 in the forward-reverse switching device 3. When the vehicle is moving backward abnormally, the clutch apply control valve 26 is located at the second position and the reverse range pressure PR can be supplied to the hydraulic servo 94 for the first brake B1.

Operation of the supply pressure switching portion 28 of the hydraulic control device 12 for the automatic transmission 10 according to the present embodiment will be described in detail based on FIG. 3.

When the line pressure PL is generated after the internal combustion engine is driven, the modulator pressure $P_{LPM2}$ is generated in the line pressure modulator valve 20. The sequence valve 25 is switched to the normal state by the modulator pressure $P_{LPM2}$. The modulator pressure $P_{LPM2}$ is supplied to the clutch apply control valve 26 through the sequence valve 25 to switch the clutch apply control valve 26 to the normal state. Both the sequence valve 25 and the clutch apply control valve 26 are in the normal state when the vehicle moves normally without any failure.

The ECU 11 controls the engagement state of the lockup clutch 16 of the torque converter 15 according to the running state of the vehicle 1 such as a vehicle speed. In this case, the ECU 11 controls the linear solenoid valve SLU to regulate the lockup control pressure PSLU that is output from the linear solenoid valve SLU, and the ECU 11 uses the lockup differential pressure control valve 22 to control the engagement state of the lockup clutch 16. In the present embodiment, the higher the lockup control pressure PSLU is, the more firmly the lockup clutch 16 is engaged.

When the vehicle 1 moves forward at low speeds, the automatic transmission 10 is in the forward stepped mode (see FIG. 2). In this case, the ECU 11 performs control so that only the first clutch C1 and the synchro mechanism S1 are engaged. First, the forward range pressure PD is output from the manual valve 21. With the forward range pressure PD being supplied as a source pressure, the engagement pressure PSL1 is output from the linear solenoid valve SL1. The engagement pressure PSL1 thus output is supplied to the hydraulic servo 91 through the clutch apply control valve 26. The first clutch C1 can thus be engaged. Since the reverse range pressure PR is not output from the manual valve 21, the S1B1 apply control valve 27 is in the non-reverse state. The modulator pressure $P_{LPM2}$ is supplied as a source pressure to the linear solenoid valve SLG through the S1B1 apply control valve 27, and the engagement pressure PSLG is output from the linear solenoid valve SLG The engagement pressure PSLG thus output is supplied to the hydraulic servo 93 through the clutch apply control valve 26 and the S1B1 apply control valve 27. The synchro mechanism S1 can thus be engaged.

When the vehicle 1 moves forward at medium or high speeds, the automatic transmission 10 is in the forward stepless mode (see FIG. 2). In this case, the ECU 11 performs control so that only the second clutch C2 and the synchro mechanism S1 are engaged. At this time, the synchro mechanism S1 is engaged depending on the vehicle speed. With the forward range pressure PD being supplied as a source pressure, the engagement pressure PSL2 is output from the linear solenoid valve SL2. The engagement pressure PSL2 thus output is supplied to the hydraulic servo 92 through the sequence valve 25. The second clutch C2 can thus be engaged.

When the vehicle 1 moves backward, the automatic transmission 10 is in the reverse stepped mode (see FIG. 2). In this case, the ECU 11 performs control so that only the first brake B1 and the synchro mechanism S1 are engaged. First, the reverse range pressure PR is output from the manual valve 21, so that the S1B1 apply control valve 27 is switched to the reverse state. The reverse range pressure PR is supplied as a source pressure to the linear solenoid valve SLG through the S1B1 apply control valve 27, and the engagement pressure PSLG is output from the linear solenoid valve SLG The engagement pressure PSLG thus output is supplied to the hydraulic servo 94 through the clutch apply control valve 26 and the S1B1 apply control valve 27. The first brake B1 can thus be engaged. The modulator pressure $P_{LPM2}$ is supplied to the hydraulic servo 93 through the S1B1 apply control valve 27. The synchro mechanism S1 can thus be engaged.

An example in which an on-failure of the linear solenoid valve SLU has occurred in the forward range will be described. Such an on-failure is not preferable because the lockup clutch 16 cannot be disengaged. Accordingly, when an on-failure of the linear solenoid valve SLU is detected, the ECU 11 causes the linear solenoid valve SLP to output a maximum primary control pressure PSLP to switch the sequence valve 25 to the failure state. The modulator pressure $P_{LPM2}$ is supplied as a source pressure to the linear solenoid valve SLG through the S1B1 apply control valve 27 that is in the non-reverse state, and the engagement pressure PSLG is output from the linear solenoid valve SLG The engagement pressure PSLG thus output is supplied to the second hydraulic oil chamber 22b of the lockup differential pressure control valve 22 through the sequence valve 25 that is in the failure state. The lockup clutch 16 is thus disengaged, and the lockup-off state is ensured to be attained in the forward range. A fail-safe can be implemented in this manner. This can especially reduce transmission of vibration from the internal combustion engine when the vehicle moves at low speeds.

An example in which an off-failure of the linear solenoid valve SL2 has occurred in the forward range will be described. The "off-failure" herein includes an all-off failure in addition to an off-failure of only the linear solenoid valve SL2. Such an off-failure is not preferable because the second clutch C2 cannot be engaged and the stepless speed change mechanism 4 cannot be used to move the vehicle. Accordingly, when an off-failure of the linear solenoid valve SL2 is detected, the ECU 11 causes the linear solenoid valve SLP to output the maximum primary control pressure PSLP to switch the sequence valve 25 to the failure state. If the off-failure is an all-off failure, the maximum primary control pressure PSLP is output from the linear solenoid valve SLP independently of control of the ECU 11 to switch the sequence valve 25 to the failure state. The forward range pressure PD is supplied to the hydraulic servo 92 through the sequence valve 25 that is in the failure state. The second clutch C2 can thus be engaged, and forward movement of the vehicle in the forward range is ensured. A fail-safe can be implemented in this manner.

An example in which an on-failure of the linear solenoid valve SL2 has occurred in the stepped mode in the forward range will be described. Such an on-failure is not preferable because there is a risk that a tie-up of the first clutch C1 and the second clutch C2 may occur. In the event of this on-failure, independently of control of the ECU 11, the engagement pressure PSL2 is supplied to the first hydraulic oil chamber 26a of the clutch apply control valve 26 through the sequence valve 25 to switch the clutch apply control valve 26 to the failure state, and the engagement pressure PSL2 is also supplied to the hydraulic servo 92. Since the clutch apply control valve 26 is switched to the failure state, supply of the engagement pressure PSL1 is cut off, and the hydraulic servo 91 is drained. This prevents a tie-up of the first clutch C1 and second clutch C2. A fail-safe can be implemented in this manner. The same applies to the case where an on-failure of the linear solenoid valve SL1 occurs.

An example in which an off-failure of the linear solenoid valve SLP has occurred in the forward range will be described. Such an off-failure is not preferable for the following reason. Since the maximum primary control pressure PSLP is constantly output from the linear solenoid valve SLP, the primary pressure control valve 23 cannot be controlled. Accordingly, a maximum primary pulley pressure P10 is constantly output, making it difficult to use the stepless speed change mechanism 4 to move the vehicle. In the event of this off-failure, the maximum primary control pressure PSLP from the linear solenoid valve SLP switches the sequence valve 25 to the failure state independently of control of the ECU 11. The modulator pressure $P_{LPM2}$ is supplied as a source pressure to the linear solenoid valve SLG through the S1B1 apply control valve 27 that is in the non-reverse state, and the engagement pressure PSLG is output from the linear solenoid valve SLG The engagement pressure PSLG thus output is supplied to the third hydraulic oil chamber 23e of the primary pressure control valve 23 through the sequence valve 25 that is in the failure state. The primary pulley pressure P10 can thus be controlled by the primary pressure control valve 23, and a driving force in the forward range is ensured. A fail-safe can be implemented in this manner.

An example in which an on-failure of the linear solenoid valve SLP has occurred in the forward range will be described. Such an on-failure is not preferable for the following reason. Since the primary control pressure PSLP is no longer output from the linear solenoid valve SLP, the primary pressure control valve 23 cannot be controlled, and a minimum primary pulley pressure P10 is constantly output, which creates a risk that the speed ratio γ may become highest and the stepless speed change mechanism 4 may cause rapid deceleration. Accordingly, when an on-failure of the linear solenoid valve SLP is detected, the ECU 11 stops output of the engagement pressure PSL2 from the linear solenoid valve SL2 to stop supply of the engagement pressure PSL2 to the hydraulic servo 92. The second clutch C2 is thus disengaged, and the driving range is shifted to the neutral range, whereby rapid deceleration is avoided. A fail-safe can be implemented in this manner. Subsequently, after the vehicle speed becomes stable, the ECU 11 engages the first clutch C1 by the engagement pressure PSL1 from the linear solenoid valve SL1 to move the vehicle forward in the stepped mode. The same applies to the case where an off-failure of the linear solenoid valve SLS occurs.

An example in which an on-failure of the linear solenoid valve SLG has occurred in the forward range will be described. Such an on-failure is not preferable because the engagement pressure PSLG is constantly output from the linear solenoid valve SLG and the synchro mechanism S1 remains engaged. Accordingly, when an on-failure of the linear solenoid valve SLG is detected, the ECU 11 causes the linear solenoid valve SLP to output the maximum primary control pressure PSLP to switch the sequence valve 25 to the failure state. The second hydraulic oil chamber 26b of the clutch apply control valve 26 to which the modulator pressure $P_{LPM2}$ had been supplied is thus drained, the forward range pressure PD is supplied to the first hydraulic oil chamber 26a of the clutch apply control valve 26 through the sequence valve 25 to switch the clutch apply control valve 26 to the failure state, and the forward range pressure PD is also supplied to the hydraulic servo 92. Since the clutch apply control valve 26 is switched to the failure state, supply of the engagement pressure PSLG is cut off, and the hydraulic servo 91 is drained. The vehicle can thus move in the stepless mode, and the synchro mechanism S1 is ensured to be disengaged. A fail-safe can be implemented in this manner. This prevents seizure of the first clutch C1.

An example in which an off-failure of the linear solenoid valve SLG has occurred in the reverse range will be described. In this case, the engagement pressure PSLG is no longer output from the linear solenoid valve SLG The first brake B1 is therefore disengaged, and the neutral state is attained. Accordingly, when an off-failure of the linear solenoid valve SLG is detected, the ECU 11 causes the linear solenoid valve SLP to output the maximum primary control pressure PSLP to switch the sequence valve 25 to the failure state. The second hydraulic oil chamber 26b of the clutch apply control valve 26 to which the modulator pressure $P_{LPM2}$ had been supplied is thus drained, and the reverse range pressure PR is supplied to the clutch apply control valve 26 to switch the clutch apply control valve 26 to the failure state. The reverse range pressure PR is thus supplied to the first brake B1 through the clutch apply control valve 26 and the S1B1 apply control valve 27. The modulator pressure $P_{LPM2}$ is supplied to the synchro mechanism S1 through the S1B1 apply control valve 27. Backward movement of the vehicle is thus ensured, and a fail-safe can be implemented in this manner.

An example in which sticking of the S1B1 apply control valve 27 in the non-reverse state has occurred in the reverse range will be described. In this case, the first brake B1 is disengaged and the neutral state is attained. Accordingly, when sticking of the S1B1 apply control valve 27 in the non-reverse state is detected, the ECU 11 causes the linear solenoid valve SLP to output the maximum primary control pressure PSLP to switch the sequence valve 25 to the failure state. The second hydraulic oil chamber 26b of the clutch apply control valve 26 to which the modulator pressure $P_{LPM2}$ had been supplied is thus drained, and the reverse range pressure PR is supplied to the clutch apply control valve 26 to switch the clutch apply control valve 26 to the failure state. Accordingly, the reverse range pressure PR is supplied to the first brake B1 through the fifth input port 26g of the clutch apply control valve 26 and the first input port 27c of the S1B1 apply control valve 27. The reverse range pressure PR is also supplied to the synchro mechanism S1 through the fourth input port 26f of the clutch apply control valve 26 and the second input port 27d of the S1B1 apply control valve 27. Backward movement of the vehicle is thus ensured, and a fail-safe can be implemented in this manner.

As described above, according to the hydraulic control device 12 for the automatic transmission 10 of the present embodiment, in the case where abnormality has occurred in, e.g., the solenoid valve portion 29, the supply pressure switching portion 28 is switched from the first state to the second state so that the forward range pressure PD can be supplied to the second clutch C2. Accordingly, even if abnormality occurs in the solenoid valve portion 29, the forward range pressure PD is supplied to the second clutch C2, whereby operation can be continued. That is, even if a failure occurs in a hydraulic circuit when the vehicle is moving at high speeds by using the stepless speed change mechanism 4, the vehicle can continue to move by using the stepless speed change mechanism 4 without switching the power transmission path. Accordingly, in the hydraulic control device 12 for the automatic transmission 10 that can switch between the first power transmission path a1 having the gear train inserted therein and the second power transmission path a2 having the stepless speed change mechanism 4 inserted therein, even if a failure occurs in the hydraulic circuit when the vehicle is moving at high speeds by using the stepless speed change mechanism 4, the power transmission path is not switched and rapid deceleration can be restrained. The vehicle can thus be ensured to move forward by using the stepless speed change mechanism 4 even in case of an all-off failure.

According to the hydraulic control device 12 for the automatic transmission 10 of the present embodiment, the supply pressure switching portion 28 cuts off supply of the engagement pressure PSL1 to the first clutch C1 in the case where the engagement pressure PSL2 is supplied to the second clutch C2 when the supply pressure switching portion 28 is in the first state, and in the case where the forward range pressure PD is supplied to the second clutch C2 when the supply pressure switching portion 28 is in the second state. This prevents a tie-up of the first clutch C1 and the second clutch C2.

The above embodiment is described with respect to the case where the supply pressure switching portion 28 can be switched between the first state where the supply pressure switching portion 28 can supply the engagement pressure PSL2 to the second clutch C2 and the second state where the supply pressure switching portion 28 can supply the forward range pressure PD to the second clutch C2. However, the present disclosure is not limited to this. For example, the supply pressure switching portion 28 may be switchable between a first state where the supply pressure switching portion 28 can supply the engagement pressure PSL1 to the first clutch C1 and a second state where the supply pressure switching portion 28 can supply the forward range pressure PD to the first clutch C1.

The above embodiment is described with respect to the case where the supply pressure switching portion 28 has three switch valves, namely the sequence valve 25, the clutch apply control valve 26, and the S1B1 apply control valve 27. However, the present disclosure is not limited to this. For example, the supply pressure switching portion 28 may have the sequence valve 25 and the clutch apply control valve 26, or may have only the sequence valve 25. In the case where the supply pressure switching portion 28 has only the sequence valve 25, a normally closed linear solenoid valve is used as the linear solenoid valve SL1, so that, in case of an off-failure of the linear solenoid valve SL1, output of the engagement pressure PSL1 is stopped without using the switch valve, whereby the first clutch C1 can be disengaged.

The above embodiment is described with respect to the case where the automatic transmission 10 has the forward-reverse switching device 3. However, the present disclosure is not limited to this. The automatic transmission 10 may not have the forward-reverse switching device 3. In this case, for example, forward and backward movements of the vehicle can be realized via an electric motor that can switch between forward and reverse rotations.

The present embodiment includes at least the following configuration. A hydraulic control device (12) for an automatic transmission (10) of the present embodiment is a hydraulic control device (12) for an automatic transmission (10), the automatic transmission (10) including an input shaft (2) drivingly coupled to a driving source of a vehicle (1), a drive shaft (60) drivingly coupled to a wheel, a stepless speed change mechanism (4) that can continuously change a speed ratio, a first engagement element (C1) inserted in a first power transmission path (a1) coupling the input shaft (2) and the drive shaft (60) via a gear train (5), and a second engagement element (C2) inserted in a second power transmission path (a2) coupling the input shaft (2) and the drive shaft (60) via the stepless speed change mechanism (4), the automatic transmission (10) being capable of switching between a first mode in which the first engagement element (C1) is engaged and the second engagement element (C2) is disengaged so that the input shaft (2) and the drive shaft (60) are connected by the first power transmission path (a1) to transmit rotation therethrough and a second mode in which the first engagement element (C1) is disengaged and the second engagement element (C2) is engaged so that the input shaft (2) and the drive shaft (60) are connected by the second power transmission path (a2) to transmit rotation therethrough, and the hydraulic control device (12) being capable of permitting and cutting off supply of an engagement pressure to the first engagement element (C1) and the second engagement element (C2). The hydraulic control device includes: a source pressure generating portion (20) that generates a source pressure ($P_{LPM2}$, PD, PR); a solenoid valve portion (29) that can supply the engagement pressure (PSL1, PSL2) based on the source pressure ($P_{LPM2}$); and a supply pressure switching portion (28) that can be switched between a first state where the supply pressure switching portion (28) can supply the engagement pressure (PSL2) to the second engagement element (C2) and a second state where the supply pressure switching portion (28) can supply the source pressure (PD) to the second engagement element (C2), the supply pressure switching portion (28) being in the first state when the solenoid valve portion (29) is operating normally, and being switched to the second state in case of abnormality in the solenoid valve portion (29). With this configuration, for example, if abnormality occurs in the solenoid valve portion (29), the supply pressure switching portion (28) is switched from the first state to the second state, so that the supply pressure switching portion (28) can supply the source pressure (PD) to the second engagement element (C2). Accordingly, even if abnormality occurs in the solenoid valve portion (29), the source pressure (PD) is supplied to the second engagement element (C2), whereby operation can be continued. That is, even if a failure occurs in a hydraulic circuit when the vehicle (1) is moving at high speeds by using the stepless speed change mechanism (4), the vehicle (1) can continue to move by using the stepless speed change mechanism (4) without switching the power transmission path (a1, a2). Accordingly, in the hydraulic control device (12) for the automatic transmission (10) that can switch between the first power transmission path (a1) having the gear train (5) inserted therein and the second power transmission path (a2) having the stepless speed change mechanism (4) inserted therein, even if a failure occurs in the hydraulic circuit when the vehicle (1) is moving at high speeds by using the stepless speed change mechanism (4), the vehicle (1) can move by using the stepless speed change mechanism (4).

In the hydraulic control device (12) for the automatic transmission (10) according to the present embodiment, the supply pressure switching portion (28) cuts off supply of the engagement pressure (PSL1) to the first engagement element (C1) in the case where the engagement pressure (PSL1) is supplied to the second engagement element (C2) when the supply pressure switching portion (28) is in the first state, and in the case where the source pressure (PD) is supplied to the second engagement element (C2) when the supply pressure switching portion (28) is in the second state. This configuration prevents a tie-up of the second engagement element (C2) and the first engagement element (C1).

In the hydraulic control device (12) for the automatic transmission (10) according to the present embodiment, the solenoid valve portion (29) includes a first solenoid valve (SL1) that can supply a first engagement pressure (PSL1) to the first engagement element (C1), and a second solenoid valve (SL2) that can supply a second engagement pressure (PSL2) to the second engagement element (C2). The supply pressure switching portion (28) includes: a first switch valve (26) that, when the supply pressure switching portion (28) is in the first state, is located at a first position where the first switch valve (26) can supply the first engagement pressure (PSL1) to the first engagement element (C1), and when the supply pressure switching portion (28) is in the second state, is located at a second position where the first switch valve (26) cuts off supply of the first engagement pressure (PSL1) to the first engagement element (C1); and a second switch valve (25) that, when the supply pressure switching portion (28) is in the first state, is located at a third position where the second switch valve (25) can supply the second engagement pressure (PSL2) to the second engagement element (C2), and also supplies a signal pressure for switching the first switch valve (26) to the second position when supplying the second engagement pressure (PSL2) to the second engagement element (C2), and that, when the supply pressure switching portion (28) is in the second state, is located at a fourth position where the second switch valve (25) can supply the source pressure to the second engagement element (C2), and also supplies a signal pressure for switching the first switch valve (26) to the second position when supplying the source pressure to the second engagement element (C2). With this configuration, operation of the supply pressure switching portion (28) can be implemented by cooperative operation of the first switch valve (26) and the second switch valve (25).

In the hydraulic control device (12) for the automatic transmission (10) according to the present embodiment, the automatic transmission (10) further includes a forward-reverse switching device (3) that switches a rotational direction according to a direction in which the vehicle (1) moves and transmits rotation in the resultant rotational direction, that includes the first engagement element (C1) and a third engagement element (B1), and that can switch between a forward mode in which the first engagement element (C1) is engaged and the third engagement element (B1) is disengaged to move the vehicle (1) forward and a reverse mode in which the first engagement element (C1) is disengaged and the third engagement element (B1) is engaged to move the vehicle (1) backward. The hydraulic control device (12) further includes: a range pressure output mechanism (21) that outputs a forward range pressure (PD) when a driving range is a forward range, and outputs a reverse range pressure (PR) when the driving range is a reverse range; and a third solenoid valve (SLG) that can supply a third engagement pressure (PSLG) to the third engagement element (B1). The source pressure that is supplied to the second engagement element (C2) when the second switch valve (25) is located at the fourth position is the forward range pressure (PD). When the vehicle (1) is moving backward normally, the first switch valve (26) is located at the first position and the third engagement pressure (PSLG) can be supplied to the third engagement element (B1). When the vehicle (1) is moving backward abnormally, the first switch valve (26) is located at the second position and the reverse range pressure (PR) can be supplied to the third engagement element (B1). With this configuration, the vehicle (1) can be ensured to move backward in case a failure occurs in the reverse range.

In the hydraulic control device (12) for the automatic transmission (10) according to the present embodiment, the automatic transmission (10) further includes a synchromesh mechanism (S1) that is inserted in the first power transmission path (a1) and that is engaged and disengaged according to whether an oil pressure is supplied thereto or not. The supply pressure switching portion (28) includes a third switch valve (27) that can be switched between a fifth position and a sixth position. When located at the fifth position, the third switch valve (27) supplies the third engagement pressure (PSLG) to the synchromesh mechanism (S1) in the case where the first switch valve (26) is located at the first position, and supplies the reverse range pressure (PR) to the synchromesh mechanism (S1) and the third engagement element (B1) in the case where the first switch valve (26) is located at the second position. When located at the sixth position, the third switch valve (27) supplies the third engagement pressure (PSLG) to the third engagement element (B1) and supplies the source pressure to the synchromesh mechanism (S1) in the case where the first switch valve (26) is located at the first position, and supplies the reverse range pressure (PR) to the third engagement element (B1) and supplies the source pressure to the synchromesh mechanism (S1) in the case where the first switch valve (26) is located at the second position. With this configuration, the vehicle (1) can be ensured to move backward even in the case of using the synchromesh mechanism (S1).

The hydraulic control device (12) for the automatic transmission (10) according to the present embodiment further includes: a primary pressure control valve (23) that can supply a primary pulley pressure (P10) to a primary pulley (41) of the stepless speed change mechanism (4); a primary control pressure solenoid valve (SLP) that can regulate the primary pulley pressure (P10) by supplying a primary control pressure (PSLP) to the primary pressure control valve (23); and a third solenoid valve (SLG) that can supply a third engagement pressure (PSLG). When the primary control pressure solenoid valve (SLP) is operating normally, the second switch valve (25) is located at the third position, the primary pulley pressure (P10) is regulated by the primary control pressure (PSLP), and in case of abnormality with the primary control pressure solenoid valve (SLP) being kept open, the second switch valve (25) is located at the fourth position, and the third engagement pressure (PSLG) is supplied to the primary pressure control valve (23) through the second switch valve (25), so that the primary pulley pressure (P10) is regulated by the third engagement pressure (PSLG). With this configuration, even in case of abnormality with the primary control pressure solenoid valve (SLP) being kept open and the primary control pressure (PSLP) being output constantly, the third engagement pressure (PSLG) is supplied to control the primary pressure control valve (23), whereby the primary pulley pressure (P10) can be regulated. A driving force in the forward range is thus ensured. A fail-safe can be implemented in this manner.

The hydraulic control device (12) for the automatic transmission (10) according to the present embodiment further includes: a lockup differential pressure control valve (22) that can switchably supply a lockup-on pressure or a lockup-off pressure to a lockup clutch (16); a lockup control pressure solenoid valve (SLU) that can switch a pressure to be supplied from the lockup differential pressure control valve (22) to the lockup-on pressure or the lockup-off pressure by supplying a lockup control pressure (PSLU) to the lockup differential pressure control valve (22); and a third solenoid valve (SLG) that can supply a third engagement pressure (PSLG). When the lockup control pressure solenoid valve (SLU) is operating normally, the second switch valve (25) is located at the third position, and the pressure to be supplied from the lockup differential pressure control valve (22) is switched to the lockup-on pressure or the lockup-off pressure by the lockup control pressure (PSLU), and in case of abnormality with the lockup control pressure solenoid valve (SLU) being kept open, the second switch valve (25) is located at the fourth position, and the third engagement pressure (PSLG) is supplied to the lockup differential pressure control valve (22) through the second switch valve (25), so that the pressure to be supplied from the lockup differential pressure control valve (22) is switched to the lockup-on pressure or the lockup-off pressure by the third engagement pressure (PSLG). With this configuration, even in case of abnormality with the lockup control pressure solenoid valve (SLU) being kept open and the lockup control pressure (PSLU) being output constantly, the third engagement pressure (PSLG) is supplied to control the lockup differential pressure control valve (22), whereby the pressure to be supplied from the lockup differential pressure control valve (22) can be switched to the lockup-on pressure or the lockup-off pressure. The lockup clutch (16) is thus disengaged, and a lockup-off state is ensured to be attained in the forward range. A fail-safe can be implemented in this manner. This can especially reduce transmission of vibration from an internal combustion engine when the vehicle (1) moves at low speeds.

A hydraulic control device (12) for an automatic transmission (10) according to the present embodiment is a hydraulic control device (12) for an automatic transmission (10), the automatic transmission (10) including an input shaft (2) drivingly coupled to a driving source of a vehicle (1), a drive shaft (60) drivingly coupled to a wheel, a stepless speed change mechanism (4) that can continuously change a speed ratio, a first engagement element (C1) inserted in a first power transmission path (a1) coupling the input shaft (2) and the drive shaft (60) via a gear train (5), a second engagement element (C2) inserted in a second power transmission path (a2) coupling the input shaft (2) and the drive shaft (60) via the stepless speed change mechanism (4), a forward-reverse switching device (3) that switches a rotational direction according to a direction in which the vehicle (1) moves and transmits rotation in the resultant rotational direction, that includes the first engagement element (C1) and a third engagement element (B1), and that can switch between a forward mode in which the first engagement element (C1) is engaged and the third engagement element (B1) is disengaged to move the vehicle (1) forward and a reverse mode in which the first engagement element (C1) is disengaged and the third engagement element (B1) is engaged to move the vehicle (1) backward, and a synchromesh mechanism (S1) that is inserted in the first power transmission path (a1) and that is engaged and disengaged according to whether an oil pressure is supplied thereto or not, the automatic transmission (10) being capable of switching between a first mode in which the first engagement element (C1) or the third engagement element (B1) and the synchromesh mechanism (S1) are engaged and the second engagement element (C2) is disengaged so that the input shaft (2) and the drive shaft (60) are connected by the first power transmission path (a1) to transmit rotation therethrough and a second mode in which at least one of the first engagement element (C1) and the third engagement element (B1) or the synchromesh mechanism (S1) is disengaged and the second engagement element (C2) is engaged so that the input shaft (2) and the drive shaft (60) are connected by the second power transmission path (a2) to transmit rotation therethrough, and the hydraulic control device (12) being capable of permitting and cutting off supply of an engagement pressure to the first engagement element (C1), the second engagement element (C2), the third engagement element (B1), and the synchromesh mechanism (S1). The hydraulic control device (12) includes: a source pressure generating portion that generates a source pressure; a solenoid valve portion (29) that can supply the engagement pressure based on the source pressure; and a supply pressure switching portion (28) that can be switched between a non-reverse state where the supply pressure switching portion (28) can supply the engagement pressure to the synchromesh mechanism (S1) and a reverse ensured state where the supply pressure switching portion (28) can supply the source pressure to both the third engagement element (B1) and the synchromesh mechanism (S1), the supply pressure switching portion (28) being in the non-reverse state when the solenoid valve portion (29) is operating normally, and being switched from the non-reverse state to the reverse ensured state in case of abnormality in the solenoid valve portion (29). With this configuration, the vehicle (1) can be ensured to move backward in case a failure occurs in the reverse range.

INDUSTRIAL APPLICABILITY

The hydraulic control device for the automatic transmission is preferably used as a hydraulic control device for an automatic transmission that is mounted on, e.g., vehicles and that includes a plurality of engagement elements to be engaged and disengaged according to whether an oil pressure is supplied thereto or not.

The invention claimed is:

1. A hydraulic control device for an automatic transmission, the automatic transmission including an input shaft drivingly coupled to a driving source of a vehicle, a drive shaft drivingly coupled to a wheel, a stepless speed change mechanism that can continuously change a speed ratio, a first engagement element inserted in a first power transmission path coupling the input shaft and the drive shaft via a gear train, and a second engagement element inserted in a second power transmission path coupling the input shaft and the drive shaft via the stepless speed change mechanism, the automatic transmission being capable of switching between a first mode in which the first engagement element is engaged and the second engagement element is disengaged so that the input shaft and the drive shaft are connected by the first power transmission path to transmit rotation therethrough and a second mode in which the first engagement element is disengaged and the second engagement element is engaged so that the input shaft and the drive shaft are connected by the second power transmission path to transmit rotation therethrough, and the hydraulic control device being capable of permitting and cutting off supply of an engagement pressure to the first engagement element and the second engagement element, the hydraulic control device comprising:

a source pressure generating valve that generates a source pressure;

a solenoid valve that can supply the engagement pressure based on the source pressure; and a supply pressure switching valve that can be switched between a first state where the supply pressure switching valve can supply the engagement pressure to the second engagement element and a second state where the supply pressure switching valve can supply the source pressure to the second engagement element, the supply pressure switching valve being in the first state when the solenoid valve is operating normally, and being switched to the second state in case of abnormality in the solenoid valve.

2. The hydraulic control device for the automatic transmission according to claim 1, wherein the supply pressure switching valve cuts off supply of the engagement pressure to the first engagement element in the case where the engagement pressure is supplied to the second engagement element when the supply pressure switching valve is in the first state, and in the case where the source pressure is supplied to the second engagement element when the supply pressure switching valve is in the second state.

3. The hydraulic control device for the automatic transmission according to claim 2, wherein the solenoid valve includes a first solenoid valve that can supply a first engagement pressure to the first engagement element, and a second solenoid valve that can supply a second engagement pressure to the second engagement element, and the supply pressure switching valve includes a first switch valve that, when the supply pressure switching valve is in the first state, is located at a first position where the first switch valve can supply the first engagement pressure to the first engagement element, and when the supply pressure switching valve is in the second state, is located at a second position where the first switch valve cuts off supply of the first engagement pressure to the first engagement element, and a second switch valve that, when the supply pressure switching valve is in the first state, is located at a third position where the second switch valve can supply the second engagement pressure to the second engagement element, and also supplies a signal pressure for switching the first switch valve to the second position when supplying the second engagement pressure to the second engagement element, and that, when the supply pressure switching valve is in the second state, is located at a fourth position where the second switch valve can supply the source pressure to the second engagement element, and also supplies a signal pressure for switching the first switch valve to the second position when supplying the source pressure to the second engagement element.

4. The hydraulic control device for the automatic transmission according to claim 3, wherein the automatic transmission further includes a forward-reverse switching device that switches a rotational direction according to a direction in which the vehicle moves and transmits rotation in the resultant rotational direction, that includes the first engagement element and a third engagement element, and that can switch between a forward mode in which the first engagement element is engaged and the third engagement element is disengaged to move the vehicle forward and a reverse mode in which the first engagement element is disengaged and the third engagement element is engaged to move the vehicle backward, the hydraulic control device further comprising:

a range pressure output mechanism that outputs a forward range pressure when a driving range is a forward range, and outputs a reverse range pressure when the driving range is a reverse range; and a third solenoid valve that can supply a third engagement pressure to the third engagement element, wherein the source pressure that is supplied to the second engagement element when the second switch valve is located at the fourth position is the forward range pressure, when the vehicle is moving backward normally, the first switch valve is located at the first position and the third engagement pressure can be supplied to the third engagement element, and when the vehicle is moving backward abnormally, the first switch valve is located at the second position and the reverse range pressure can be supplied to the third engagement element.

5. The hydraulic control device for the automatic transmission according to claim 4, wherein the automatic transmission further includes a synchromesh mechanism that is inserted in the first power transmission path and that is engaged and disengaged according to whether an oil pressure is supplied thereto or not, the supply pressure switching valve includes a third switch valve that can be switched between a fifth position and a sixth position, when located at the fifth position, the third switch valve supplies the third engagement pressure to the synchromesh mechanism in the case where the first switch valve is located at the first position, and supplies the reverse range pressure to the synchromesh mechanism and the third engagement element in the case where the first switch valve is located at the second position, and when located at the sixth position, the third switch valve supplies the third engagement pressure to the third engagement element and supplies the source pressure to the synchromesh mechanism in the case where the first switch valve is located at the first position, and supplies the reverse range pressure to the third engagement element and supplies the source pressure to the synchromesh mechanism in the case where the first switch valve is located at the second position.

6. The hydraulic control device for the automatic transmission according to claim 3, further comprising:

a primary pressure control valve that can supply a primary pulley pressure to a primary pulley of the stepless speed change mechanism;

a primary control pressure solenoid valve that can regulate the primary pulley pressure by supplying a primary control pressure to the primary pressure control valve; and a third solenoid valve that can supply a third engagement pressure, wherein when the primary control pressure solenoid valve is operating normally, the second switch valve is located at the third position, the primary pulley pressure is regulated by the primary control pressure, and in case of abnormality with the primary control pressure solenoid valve being kept open, the second switch valve is located at the fourth position, and the third engagement pressure is supplied to the primary pressure control valve through the second switch valve, so that the primary pulley pressure is regulated by the third engagement pressure.

7. The hydraulic control device for the automatic transmission according to claim 3, further comprising:

a lockup differential pressure control valve that can switchably supply a lockup-on pressure or a lockup-off pressure to a lockup clutch;

a lockup control pressure solenoid valve that can switch a pressure to be supplied from the lockup differential pressure control valve to the lockup-on pressure or the lockup-off pressure by supplying a lockup control pressure to the lockup differential pressure control valve; and a third solenoid valve that can supply a third engagement pressure, wherein when the lockup control pressure solenoid valve is operating normally, the second switch valve is located at the third position, and the pressure to be supplied from the lockup differential pressure control valve is switched to the lockup-on pressure or the lockup-off pressure by the lockup control pressure, and in case of abnormality with the lockup control pressure solenoid valve being kept open, the second switch valve is located at the fourth position, and the third engagement pressure is supplied to the lockup differential pressure control valve through the second switch valve, so that the pressure to be supplied from the lockup differential pressure control valve is switched to the lockup-on pressure or the lockup-off pressure by the third engagement pressure.

8. A hydraulic control device for an automatic transmission, the automatic transmission including an input shaft drivingly coupled to a driving source of a vehicle, a drive shaft drivingly coupled to a wheel, a stepless speed change mechanism that can continuously change a speed ratio, a first engagement element inserted in a first power transmission path coupling the input shaft and the drive shaft via a gear train, a second engagement element inserted in a second power transmission path coupling the input shaft and the drive shaft via the stepless speed change mechanism, a forward-reverse switching device that switches a rotational direction according to a direction in which the vehicle moves and transmits rotation in the resultant rotational direction, that includes the first engagement element and a third engagement element, and that can switch between a forward mode in which the first engagement element is engaged and the third engagement element is disengaged to move the vehicle forward and a reverse mode in which the first engagement element is disengaged and the third engagement element is engaged to move the vehicle backward, and a synchromesh mechanism that is inserted in the first power transmission path and that is engaged and disengaged according to whether an oil pressure is supplied thereto or not, the automatic transmission being capable of switching between a first mode in which the first engagement element or the third engagement element and the synchromesh mechanism are engaged and the second engagement element is disengaged so that the input shaft and the drive shaft are connected by the first power transmission path to transmit rotation therethrough and a second mode in which at least one of the first engagement element and the third engagement element or the synchromesh mechanism is disengaged and the second engagement element is engaged so that the input shaft and the drive shaft are connected by the second power transmission path to transmit rotation therethrough, and the hydraulic control device being capable of permitting and cutting off supply of an engagement pressure to the first engagement element, the second engagement element, the third engagement element, and the synchromesh mechanism, the hydraulic control device comprising:

a source pressure generating valve that generates a source pressure;

a solenoid valve that can supply the engagement pressure based on the source pressure; and a supply pressure switching valve that can be switched between a non-reverse state where the supply pressure switching valve can supply the engagement pressure to the synchromesh mechanism and a reverse ensured state where the supply pressure switching valve can supply the source pressure to both the third engagement element and the synchromesh mechanism, the supply pressure switching valve being in the non-reverse state when the solenoid valve is operating normally, and being switched from the non-reverse state to the reverse ensured state in case of abnormality in the solenoid valve.

* * * * *